(12) United States Patent
Bonnstetter et al.

(10) Patent No.: US 12,072,171 B1
(45) Date of Patent: *Aug. 27, 2024

(54) PREFRAGMENTED WARHEADS WITH ENHANCED PERFORMANCE

(71) Applicant: Northrop Grumman Systems Corporation, Falls Church, VA (US)

(72) Inventors: Gabriel J. Bonnstetter, Maple Grove, MN (US); Richard M. Truitt, Champlin, MN (US); Reid W. Wagnild, Plymouth, MN (US)

(73) Assignee: Northrop Grumman Systems Corporation, Falls Church, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/125,796

(22) Filed: Mar. 24, 2023

Related U.S. Application Data

(63) Continuation of application No. 17/460,678, filed on Aug. 30, 2021, now Pat. No. 11,614,311, which is a continuation-in-part of application No. 16/873,516, filed on Apr. 24, 2020, now Pat. No. 11,105,596, which is a continuation of application No. 15/466,476, filed on Mar. 22, 2017, now Pat. No. 10,634,472.

(Continued)

(51) Int. Cl.
| | |
|---|---|
| *F42B 12/32* | (2006.01) |
| *F42B 12/56* | (2006.01) |
| *F42B 33/02* | (2006.01) |
| *B29C 39/02* | (2006.01) |
| *B29C 39/10* | (2006.01) |
| *B29K 101/12* | (2006.01) |
| *B29K 705/00* | (2006.01) |
| *B29L 31/00* | (2006.01) |

(52) U.S. Cl.
CPC ............. *F42B 12/32* (2013.01); *F42B 12/56* (2013.01); *F42B 33/0214* (2013.01); *B29C 39/021* (2013.01); *B29C 39/10* (2013.01); *B29K 2101/12* (2013.01); *B29K 2705/00* (2013.01); *B29L 2031/7772* (2013.01)

(58) Field of Classification Search
CPC ................................ F42B 12/32; F42B 12/56
See application file for complete search history.

(56) References Cited

U.S. PATENT DOCUMENTS

| | | |
|---|---|---|
| 2,343,818 A | 3/1944 | Sweeley |
| 2,377,174 A | 5/1945 | Parker |

(Continued)

*Primary Examiner* — J. Woodrow Eldred
(74) *Attorney, Agent, or Firm* — Christensen, Fonder, Dardi & Herbert, PLLC

(57) ABSTRACT

An explosive device, such as a missile, artillery round, aerial bomb, mortar round, or mine, that utilizes a wall structure that upon detonation provides displacement of smaller fragments interstitially between larger fragments. The displacement of the smaller fragments into the interstitial spaces at detonation creates an expanding fragmentation curtain that momentarily contains expanding gases to increase the impulse pressure of the explosion, thereby increasing the kinetic energy imparted to the fragments. In some embodiments, the wall structure includes ordered layers of preformed metal fragments encased in binder material that suspends the fragments in a desired arrangement prior to detonation.

20 Claims, 16 Drawing Sheets

Related U.S. Application Data

(60) Provisional application No. 62/311,737, filed on Mar. 22, 2016, provisional application No. 63/120,968, filed on Dec. 3, 2020.

(56) References Cited

U.S. PATENT DOCUMENTS

| | | |
|---|---|---|
| 2,413,008 A | 12/1946 | Taglialatela |
| 2,479,861 A | 8/1949 | Pass |
| 2,892,401 A | 3/1959 | Michelson |
| 3,263,612 A | 8/1966 | Throner, Jr. |
| 3,474,731 A | 10/1969 | Thomanek |
| 3,498,224 A | 3/1970 | Cordle et al. |
| 3,667,390 A | 6/1972 | Medin et al. |
| 3,675,577 A | 7/1972 | Sternberg et al. |
| 3,724,379 A | 4/1973 | Davis |
| 3,741,123 A | 6/1973 | Dittrich |
| 3,815,504 A | 6/1974 | Tieben |
| 3,820,464 A | 6/1974 | Dixon |
| 3,838,642 A | 10/1974 | Shimberg |
| 3,877,381 A | 4/1975 | McCoy |
| 3,952,659 A | 4/1976 | Sistino |
| 3,974,771 A | 8/1976 | Thomanek |
| 3,977,327 A | 8/1976 | Brumfield et al. |
| 3,978,796 A | 9/1976 | Hackman |
| 4,089,267 A | 5/1978 | Mescall et al. |
| 4,106,410 A | 8/1978 | Borcher et al. |
| 4,123,974 A | 11/1978 | Mutsch et al. |
| 4,173,930 A | 11/1979 | Faires, Jr. |
| 4,303,015 A | 12/1981 | Bourlet |
| 4,524,696 A | 6/1985 | Altenau et al. |
| 4,644,867 A | 2/1987 | Hellner et al. |
| 4,648,323 A | 3/1987 | Lawther |
| 4,686,904 A | 8/1987 | Staffore |
| 4,718,348 A | 1/1988 | Ferrigno |
| 4,760,793 A | 8/1988 | Herring, III |
| 4,781,118 A | 11/1988 | Assmann |
| 4,882,996 A | 11/1989 | Bock et al. |
| 4,913,054 A | 4/1990 | Petersen |
| 4,936,217 A | 6/1990 | Hofmann et al. |
| 4,982,666 A | 1/1991 | Wohler |
| 4,982,668 A | 1/1991 | Bender et al. |
| 4,996,923 A | 3/1991 | Theising |
| 5,020,438 A | 6/1991 | Brown |
| 5,107,766 A | 4/1992 | Schliesske et al. |
| 5,313,890 A | 5/1994 | Cuadros |
| 5,325,786 A | 7/1994 | Petrovich |
| 5,404,813 A | 4/1995 | Wong |
| 5,527,376 A | 6/1996 | Amick et al. |
| 5,648,637 A | 7/1997 | Clark, III |
| 5,925,845 A | 7/1999 | Tompkins et al. |
| 6,161,482 A | 12/2000 | Clark |
| 6,202,561 B1 | 3/2001 | Head et al. |
| 6,276,278 B1 | 8/2001 | Korpe |
| 6,981,672 B2 | 1/2006 | Clancy et al. |
| 7,156,024 B2 | 1/2007 | Ronn et al. |
| 7,607,393 B2 | 10/2009 | Menefee |
| 7,614,348 B2 | 11/2009 | Truitt et al. |
| 7,765,933 B2 | 8/2010 | Poore et al. |
| 8,061,275 B1 | 11/2011 | Gold |
| 8,122,832 B1 | 2/2012 | Wei |
| 8,171,849 B2 | 5/2012 | Amick |
| 8,176,849 B1 | 5/2012 | Gold et al. |
| 8,622,000 B2 | 1/2014 | Meyer |
| 8,931,415 B2 | 1/2015 | Volkmann |
| 8,973,503 B2 | 3/2015 | Dunaway et al. |
| 10,634,472 B1 | 4/2020 | Bonnstetter et al. |
| 11,105,596 B1 | 8/2021 | Bonnstetter et al. |
| 11,614,311 B1 | 3/2023 | Bonnstetter et al. |
| 2004/0074413 A1 | 4/2004 | Ronn et al. |
| 2004/0089185 A1 | 5/2004 | Ronn et al. |
| 2009/0211484 A1 | 8/2009 | Truitt et al. |
| 2014/0020590 A1 | 1/2014 | Ronn et al. |
| 2014/0230682 A1 | 8/2014 | Bonnstetter et al. |
| 2016/0349027 A1 | 12/2016 | Kerns et al. |
| 2016/0377398 A1 | 12/2016 | Daebelliehn |
| 2023/0132848 A1* | 5/2023 | Griffiths .................. F42B 12/32 102/495 |
| 2023/0358519 A1* | 11/2023 | Thuman ................ F42B 33/001 |

\* cited by examiner

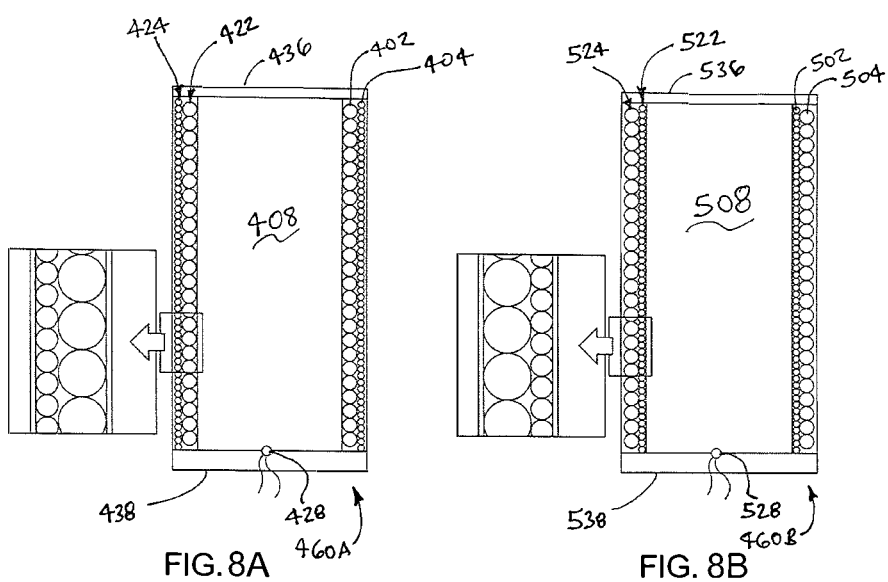

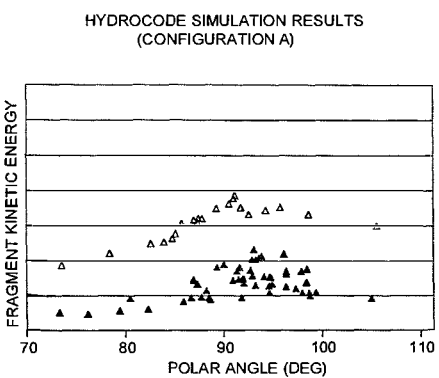
FIG. 9A
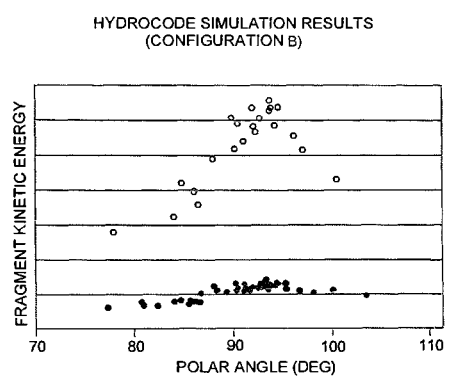
FIG. 9B
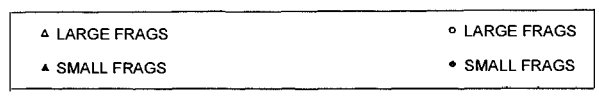
FIG. 9C - LEGEND

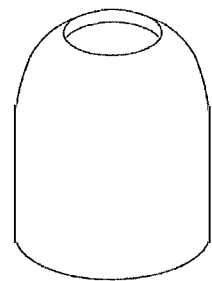
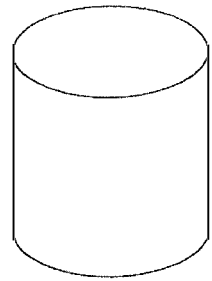
FIG. 13  FIG. 14
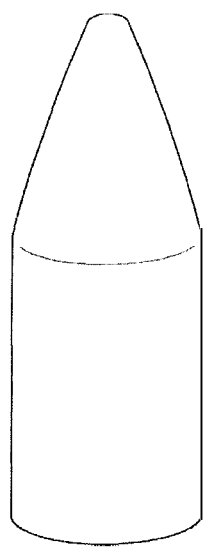
FIG. 15

PREFRAGMENTED WARHEADS WITH ENHANCED PERFORMANCE

RELATED APPLICATIONS

This application is a continuation of U.S. patent application Ser. No. 17/460,678, filed Aug. 30, 2021, now U.S. Pat. No. 11,614,311, issued on Mar. 28, 2023, which is a continuation-in-part of U.S. patent application Ser. No. 16/873,516, filed Apr. 24, 2020, now U.S. Pat. No. 11,105,596, issued on Aug. 31, 2021, which is a continuation of U.S. patent application Ser. No. 15/466,476, filed Mar. 22, 2017, now U.S. Pat. No. 10,634,472, issued on Apr. 28, 2020, which claims the benefit of U.S. Provisional Patent Application No. 62/311,737, filed Mar. 22, 2016. This application also claims the benefit of U.S. Provisional Patent Application No. 63/120,986, filed Dec. 3, 2020. The disclosures of the above-referenced patents and applications are hereby incorporated by reference herein in their entirety.

FIELD OF THE TECHNOLOGY

The present disclosure relates generally to weapons and, more particularly, to warheads including preformed fragments.

BACKGROUND

When U.S. military personnel go into battle, they rely on sophisticated and efficient weaponry to defeat enemy forces. In an effort to reduce the number of causalities suffered by U.S. forces, modern weapons are designed to deliver payloads from great distances with uncanny accuracy. Examples of these modern weapons include guided missiles, guided bombs dropped from aircraft including unmanned aerial vehicles (UAVs), and guided artillery shells. The primary destructive power of these weapons is provided by the warheads they carry.

Warheads are used in a variety of military applications to deliver a distribution of high-velocity fragments across a target area. The penetration effectiveness of a fragment when it strikes a target is directly proportional to the fragment's kinetic energy. The fragments kinetic energy is derived from an explosion. An explosion is a rapid increase in volume and release of energy accompanied by the generation of high temperatures and the release expanding gases. Supersonic explosions created by high explosives are known as detonations and travel via supersonic shock waves.

SUMMARY OF THE DISCLOSURE

A deliverable weapon, such as a missile, an artillery round, an aerial bomb, a mortar round, or a grenade, having an explosive fragmentation portion, in embodiments configured as a warhead, utilizes concentric annular sleeves that upon detonation provide placement of smaller fragments of an inner annular sleeve interstitially with respect to larger fragments of an outer annular sleeve in an expanding fragmentation curtain that contains expanding gases to increase the pressure of the explosion and the kinetic energy transferred to the fragments. In some embodiments, the sleeves are comprised of ordered layers of spherical metal fragments encased in a binding material and an outer casing.

According to an example embodiment, a warhead for a deliverable or non-deliverable weapon comprises an explosive charge and a first sleeve comprising a first set of uniform sized spherical fragments embedded in a binder disposed about the explosive charge. The warhead also includes a second sleeve comprising a second set of uniform sized spherical fragments embedded in a binder and disposed about the first sleeve. In this example embodiment, the first set of fragments comprise small fragments and the second set of fragments comprise large fragments. The warhead may also include a housing containing the first sleeve, the second sleeve, and the explosive charge.

In some example embodiment, the second sleeve has a single row of spherical fragments in an ordered arrangement. In some example embodiments, the arrangement of the spherical fragments may be somewhat chaotic generally due to the fragment sleeve thickness being greater than the fragment diameter. In some example embodiments, the large fragments in the second set of fragments are arranged in a plurality of axial columns and circumferential rows with adjacent circumferential rows being offset from one another in an axial direction and adjacent axial columns being offset from one another in a circumferential direction. It is contemplated that the fragments may have various non-spherical shapes in some embodiments.

In embodiments, an explosive fragmentation portion may be planar or dome shaped fragmentation wall, with smaller projectiles, being greater in numbers, positioned against explosive material, and larger projectiles, being fewer in number than the smaller projectiles, positioned at the outer margin of the fragmentation wall. Such planar or dome shaped explosive portions may be suitable for use as mines, for example. In embodiments, a wall portion of different sized projectiles having an inner margin at an explosive material and an outer margin with a gradient of different sized projectiles extending from the inner margin to the outer dispersion margin. In embodiments the different sized projectiles may be in ordered layers, in embodiments the layers may be disordered with overlapping of the layers of different sized projectiles. In embodiments, the numbers of each size of projectiles of a certain size of a plurality of sizes, decreases at the size decreases. "Size" may be volumetric size, or size with a greatest measured length dimension. In embodiments, there may be two, three, four, or more differently sized projectiles. In embodiments, having three or more different sizes of projectiles, a layer of the smallest projectiles are arranged at an inner margin next to an explosive material, a layer of the largest projectiles are arranged at an outer dispersion margin. Intermediate sized projectiles, of one size or a plurality of sizes, may be positioned intermediate the layer of the smallest projectiles and the layer of the largest projectiles. The intermediate sized projectiles may or may not be in ordered layers by size.

In some cases, the large fragments are larger than the small fragments diametrically by at least 50%. In other embodiments, the large fragments are larger than the small fragments diametrically by at least 100%. In some embodiments, volumetrically, the large fragments are at least 300% larger than the small fragments. In some embodiments, volumetrically, the large fragments are at least 600% larger than the small fragments.

In some cases, the mean sizes of the large fragments are larger than the mean size of the small fragments diametrically by at least 50%. In other embodiments, the means size of the large fragments are larger than the mean size of the small fragments diametrically by at least 100%. In some embodiments, volumetrically, the mean sizes of the large fragments are at least 300% larger than the mean size of the small fragments. In some embodiments, volumetrically, the mean sizes of the large fragments are at least 600% larger than the mean size of the small fragments. In some embodiments, substantially all of the large fragments are larger than substantially all of the small fragments. In some cases, the mean sizes of the greatest linear dimension of the large fragments are larger than the mean size of the greatest linear dimension of the small fragments by at least 50%. In other embodiments, the means size of the greatest linear dimension of the large fragments are larger than the greatest linear dimension of the mean size of the small fragments by at least 100%. In other embodiments, the means size of the greatest linear dimension of the large fragments are larger than the greatest linear dimension of the mean size of the small fragments by at least 300%.

In some example embodiments, the first sleeve is disposed between the explosive charge and the second sleeve so that expanding gases produced by the explosive charge upon detonation push the small fragments into contact with the large fragments. Also in some example embodiments, the small and large fragments have curved outer surfaces that facilitate migration of the small fragments into interstitial spaces between the large fragments when small fragments are forced into contact with large fragments upon detonation of the explosive charge so that the flow of the expanding gases through the interstitial spaces is restricted by the small fragments. The small fragments and the large fragments may form an expanding fragmentation curtain that provides improved containment of expanding gases compared to other fragmentation arrangements, and increases the total kinetic energy of the fragments.

The acceleration of the smaller fragments compared to the larger fragments, presuming common densities, varies with the inverse of the radii of the fragments. Thus, under the same explosive pressure, the larger fragments will not accelerate as fast as the smaller fragments, and immediately post detonation, will have less velocity and less kinetic energy. Placing small fragments interior to the large fragments such that the small fragments acceleration is impeded by larger fragments, the small and large fragments coalesce into a curtain immediately after the explosion providing an enhanced dynamic containment of the expanding gases increasing the pressure of the explosion and ultimately the kinetic energy of the fragments. Thus, a feature and advantage of some embodiments of the disclosure is that with the bound uniform small fragments interior to the bound large fragments in an explosive condition, after the small and large fragments are unbound as the binder disintegrates, the small and large fragments provide an improved coalescence, that is, a generally greater density of fragments large and small, providing improved containment of the expanding explosive gases, increasing the explosive pressure providing enhanced acceleration and velocity to the fragments, large and small, and providing a net increase in kinetic energy of the totality of the fragments. In embodiment, particularly providing an increase in the kinetic energy of the larger fragments.

In some example embodiments, the first wall of the first sleeve comprises a first binding material, the second wall of the second sleeve comprises a second binding material, and the first binding material is substantially the same as the second binding material. In some example embodiments, the first binding material and/or the second binding material may comprise a thermoplastic resin. In some example embodiments, the first binding material and/or the second binding material may comprise a thermosetting polymer. In some example embodiments, the first binding material and/or the second binding material may comprise an epoxy.

In some example embodiments, the first binding material and the second binding material hold the small fragments separate from the large fragments prior to detonation of the explosive charge and the first binding material and the second binding material break into pieces and/or disintegrate upon detonation of the explosive charge so that the small fragments and the large fragments are free to contact each other.

In some example embodiments, the small fragments and the large fragments have a first infrangibility, the first binding material and the second binding material have a second infrangibility, and the first infrangibility is greater than the second infrangibility. It is contemplated that small fragments and/or large fragments may be deformed after detonation of explosive charge. Whether or not the fragments are deformed, the infrangibility of the fragments may be sufficient to prevent each fragment from breaking into a plurality of pieces.

In some example embodiments, the binding material is generally frangible and the fragments generally are not; stated differently, the first binding material is more frangible than the first fragments and the second binding material is more frangible than the second fragments. That is, for example, during the detonation of the explosive charge the first binding material disintegrates and the first fragments mostly remain intact; additionally the second binding material disintegrates and the second fragments mostly remain intact.

In some embodiments, the binding material is generally frangible and the fragments are generally are not. The fragments are ductile and the binding material is not. In some embodiments, upon detonation, the binding material is generally frangible and the fragments are generally are not, and the fragments are ductile and the binding material is not.

In some example embodiments, the small fragments and the large fragments comprise the same material. For example, the small fragments and the large fragments may both comprise a tungsten alloy or they may comprise steel.

In some example embodiments, the majority of the small fragments in the first set of fragments have a generally spherical outer surface. For example, substantially all of the small fragments in the first set of fragments have a generally spherical outer surface in some embodiments. In some example embodiments, the majority of the small fragments in the first set have substantially equal diameters. For example, substantially all of the small fragments in the first set of fragments may have substantially equal diameters in some embodiments.

In some example embodiments, the majority of the large fragments in the second set of fragments have a generally spherical outer surface. For example, substantially all of the large fragments in the second set of fragments have a generally spherical outer surface in some embodiments.

An illustrative method of manufacturing a warhead may include loading a first multiplicity of spherical fragments of a uniform first size within a first annular containment in an ordered arrangement and filling the first annular containment with a first annular containment binder for at least substantially covering the first multiplicity of spherical fragments. The first annular containment binder may have a flowable condition to facilitate filling of the first annular containment. The illustrative method may include allowing the binder to harden wherein the spherical fragments are embedded within the first annular containment binder in a first annular form having the shape of the first annular containment. This illustrative method may also include loading a second multiplicity of spherical fragments of a uniform second size within a second annular containment having a wall surface that corresponds to a wall surface of the first annular containment. This method may additionally include filling the second annular containment with a second annular containment binder for at least substantially covering the multiplicity of spherical fragments. The second annular containment binder may have a flowable condition to facilitate filling of the second annular containment. The method may include allowing the second annular containment binder to harden wherein the spherical fragments are embedded within the second annular containment binder in a second annular form with the shape of the second annular containment. An explosive material may be positioned within a cavity defined by the annular forms. The first annular form, the second annular form and the explosive material may be positioned within a housing with one annular form interior to the other annular form.

In some embodiments, a method of manufacturing a warhead comprises, loading a first multiplicity of spherical fragments of a uniform first size within a first annular containment in an ordered arrangement; filling the first annular containment with a first annular containment binder for at least substantially covering the first multiplicity of spherical fragments, the first annular containment binder having a flowable condition; allowing the binder to harden wherein the spherical fragments are embedded within the first annular containment binder in a first annular form having the shape of the first annular containment; loading a second multiplicity of spherical fragments of a uniform second size within a second annular containment having an inner wall surface that dimensionally corresponds to an outer wall of the first annular containment, the uniform second size diametrically at least 50 percent larger than the uniform size of the first multiplicity of spherical fragments; filling second annular containment with a second annular containment binder for at least substantially covering the multiplicity of spherical fragments, the first annular containment binder having a flowable condition; allowing the second annular containment binder to harden wherein the spherical fragments are embedded within the second annular containment binder in a second annular form with the shape of the second annular containment; positioning explosive material within a cavity defined by the first annular form; and affixing the first annular form and the second annular form within a housing with the first annular form interior to the second annular form; whereby upon detonation, an enhanced coalescence of small and large fragments post detonation increases the post explosion pressurization providing a net increase in kinetic energy.

Some example methods may include utilizing the first annular form to define part of the second annular containment and/or utilizing the second annular form to define part of the first annular containment.

Some example methods may include loading the second multiplicity of fragments such that each fragment that is not at a periphery of the ordered arrangement is in contact with at least four other adjacent fragments of the same size.

In some embodiments of the disclosure, a method of increasing the kinetic energy of a multiple layered fragmentation device includes providing a layer of smaller fragments each with a mass inside of a layer of larger fragments, the larger fragments having a greater mass than the smaller fragments, and placing explosive material inside the layer inside the layer of smaller fragments.

In various embodiments of the disclosure, a method of increasing the kinetic energy of a multiple layered fragmentation device includes providing a layer of fragments, the fragments in the layer all having substantially the same size, providing fragments with substantially the same mass, the layer of fragments each with a mass inside of a layer of larger fragments, the larger fragments having a greater mass than the smaller fragments.

Some example methods may include overmolding one of the first annular form and the second annular form over the other of the first annular form and the second annular form.

Some example methods may include utilizing a thermoplastic resin as the first annular containment binder. A thermoplastic resin may also be utilized for the second annular containment binder in some example methods.

Some example methods may include installing the warhead in a deliverable weapon such as a missile, an artillery round, an aerial bomb, a mortar round, or other fired projectiles, or a grenade. The methods and apparatus herein may also be utilized in a fixed application, such as a land mine or other non-delivered applications.

Some example methods may include selecting a uniform size for the large fragments that is diametrically at least 100 percent larger than the uniform size of the small fragments.

Some example methods, may include selecting a uniform size for the greatest linear dimension of the large fragments that is at least 100 percent larger than the greatest linear dimension of the small fragments. Where there is some variability in the size of the large fragments and/or the small fragments, the greatest linear dimension is the mean greatest linear dimension of the large and/or small fragments.

Some example methods may include utilizing steel for the spherical fragments of the first multiplicity of spherical fragments and for the second multiplicity of spherical fragments.

Some example methods may include utilizing a tungsten alloy for the spherical fragments of the first multiplicity of spherical fragments and for the second multiplicity of spherical fragments.

In some example embodiments, the maximum diameter of the spherical fragments of the second multiplicity of spherical fragments is 0.300 inches or less.

In some example embodiments, the majority of the large fragments in the second set have substantially equal diameters. For example, substantially all of the large fragments in the second set of fragments may have substantially the equal diameters in some embodiments.

In some embodiments an inner layer is sandwiched between an explosive portion and an outer layer, with portions of the inner layer having smaller fragments than a coinciding portion of the outer layer. Other portions of the inner layer may not have smaller fragments than a respective coinciding portion of the outer layer, for example at corners or end portions of the inner layer. Thus, in some embodiments, a particular pair of layers of fragments need not have uniformity of fragmentation sizes or uniformity of the differentiation between the sizes of the inner and outer layer throughout the respective layers. In some embodiments, the inner layer may be comprised of spherical fragments and the outer layer non-spherical fragments.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

FIG. 8A is a stylized cross-sectional view illustrating a first warhead configuration for comparison purposes;

FIG. 8B is a stylized cross-sectional view illustrating a second warhead configuration;

FIG. 9A is a graph showing the results of hydrocode analysis performed on the warhead configuration illustrated in FIG. 8A;

FIG. 9B is a graph showing the results of hydrocode analysis performed on the warhead configuration illustrated in FIG. 8B;

FIG. 9C is a legend for the charts of FIGS. 9A and 9B.

FIGS. 13 through 15 are perspective views of warheads according to embodiments of the disclosure;

Figure 1:
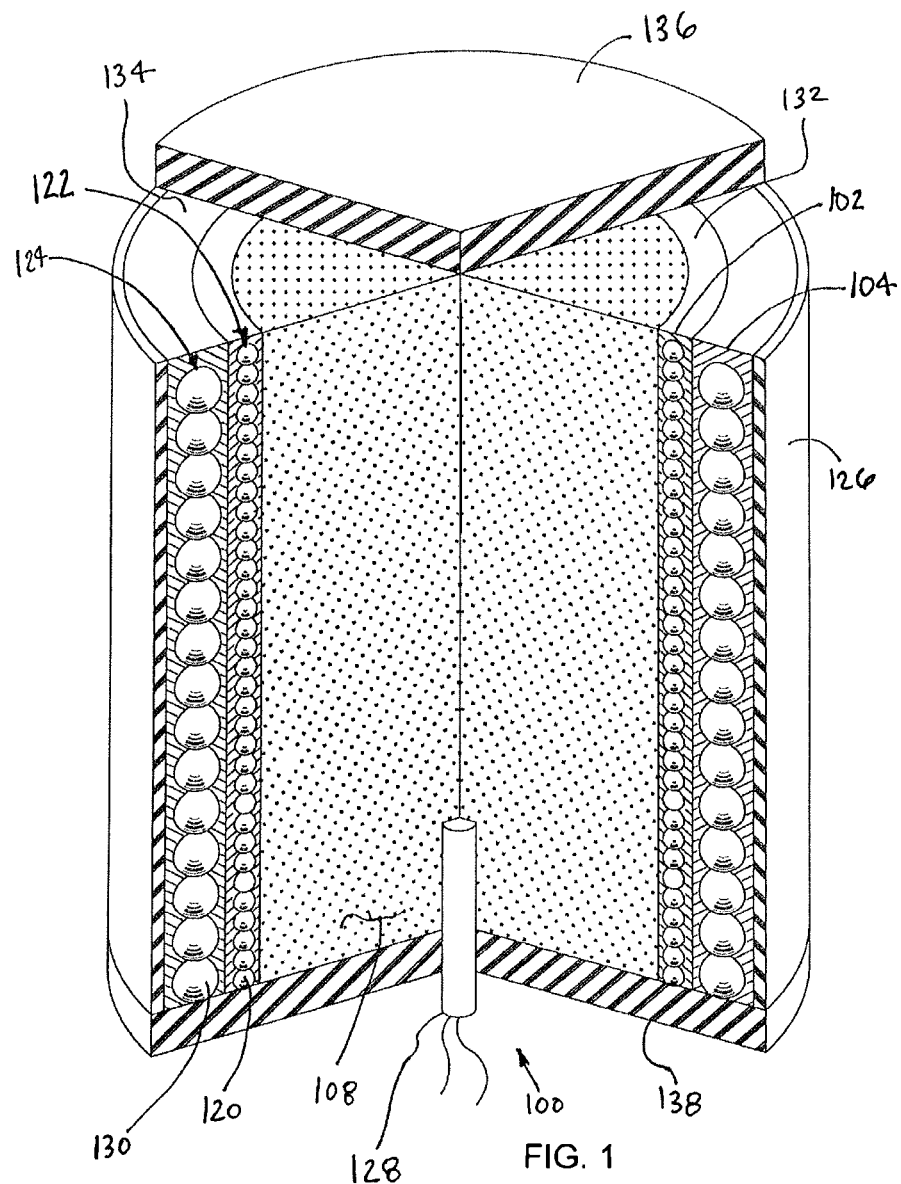
FIG. 1 is a perspective view showing a partially cross-sectioned warhead.

While the disclosed embodiments are amenable to various modifications and alternative forms, specifics thereof have been shown by way of example in the drawings and will be described in detail. It should be understood, however, that the intention is not to limit the claims to the particular embodiments described. On the contrary, the intention is to cover all modifications, equivalents, and alternatives falling within the spirit and scope of the disclosure.

DETAILED DESCRIPTION

In the following description, like reference characters designate like or corresponding parts throughout the several views. Also in the following description, it is to be understood that such terms as "forward," "rearward," "left," "right," "upwardly," "downwardly," and the like are words of convenience and are not to be construed as limiting terms.

Referring to FIG. 1, a perspective view showing a partially cross-sectioned warhead 100 is depicted in accordance with the present detailed description. Warhead 100 of FIG. 1 comprises an explosive charge 108. Explosive charge 108 may comprise a cylindrical container filled with high explosives. A first sleeve 102 comprising a first set 122 of preformed fragments is disposed about explosive charge 108. A second sleeve 104 comprising a second set 124 of preformed fragments is disposed about both first sleeve 102 and explosive charge 108. With reference to FIG. 1, it will be appreciated that first sleeve 102 is sandwiched between explosive charge 108 and second sleeve 104 in the embodiment of FIG. 1. In some embodiments, the fragments may be spherical as illustrated and are formed of metal, such as steel or tungsten.

In the embodiment of FIG. 1, the fragments of first sleeve 102 comprise relatively small fragments 120 and the fragments of second sleeve 104 comprise relatively large fragments 130 that are larger than small fragments 120. In the embodiment of FIG. 1, small fragments 120 are held in place by a first binding material 132 of first sleeve 102. Large fragments 130 are held in place by a second binding material 134 of second sleeve 104 in the embodiment of FIG. 1. In some embodiments, first binding material 132 and second binding material 134 may comprise the same material. Upon detonation of explosive charge 108, first binding material 132 and second binding material 134 may disintegrate so that small fragments 120 and large fragments 130 become unbound. When this is the case, small fragments 120 and large fragments 130 are free from the binding effect of first binding material 132 and second binding material 134 after detonation of explosive charge 108. In some example embodiments, the first binding material and/or the second binding material may comprise a thermoplastic resin. In some example embodiments, the first binding material and/or the second binding material may comprise a thermosetting polymer. In some example embodiments, the first binding material and/or the second binding material may comprise an epoxy.

It is contemplated that small fragments 120 and/or large fragments 130 may be deformed after detonation of explosive charge 108. In some useful embodiments, small fragments 120 and large fragments 130 are both preformed fragments having sufficient infrangibility and sufficient ductility to remain intact after detonation of explosive charge 108. First binding material 132 and second binding material 134 hold the fragments in place until detonation of explosive charge 108. However, first binding material 132 and second binding material 134 lack sufficient strength to remain intact after detonation of explosive charge 108. Said another way, the binding materials are more frangible and more brittle than the fragments. In particular, first binding material 132 is more frangible than small fragments 120 and second binding material 134 is more frangible than large fragments 130. In some embodiments, first binding material 132 and second binding material 134 obliterate upon detonation of explosive charge 108. Small fragments 120 and large fragments 130 are free to move relative to each other after first binding material 132 and second binding material 134 have broken into small pieces.

In the embodiment of FIG. 1, each small fragment 120 and each large fragment 130 has a generally spherical outer surface. With reference to FIG. 1, it will be appreciated that small fragments 120 of first sleeve 102 are sandwiched between explosive charge 108 and the large fragments 130 of second sleeve 104. With first sleeve 102 disposed between explosive charge 108 and second sleeve 104, expanding gases produced by explosive charge 108 upon detonation will push small fragments 120 into contact with large fragments 130. In some useful embodiments, small fragments 120 and large fragments 130 have curved outer surfaces that facilitate migration of small fragments 120 into interstitial spaces between large fragments 130 when small fragments 120 are forced into contact with large fragments 130 upon detonation of explosive charge 108. The presence of small fragments 120 in the interstitial spaces between large fragments 130 may restrict the flow of the expanding gases between large fragments 130.

In this way, small fragments 120 and large fragments 130 may cooperate to contain the expanding gases for a longer time before venting of expanding gases has occurred. Increased containment of the expanding gases over a longer period of time may increase the kinetic energy transferred to the large fragments 130, while only minimally reducing the kinetic energy of the small fragments upon detonation of the explosive charge, thus increasing the total fragmentation kinetic energy significantly.

Warhead 100 of FIG. 1 includes a sheath 126 that is disposed about second sleeve 104, first sleeve 102 and explosive charge 108. A first cap 136 is fixed to a first end of sheath 126 and a second cap 138 is fixed to a second end of sheath 126. In FIG. 1, a detonator 128 of warhead 100 can be seen contacting explosive charge 108.

Figure 2:
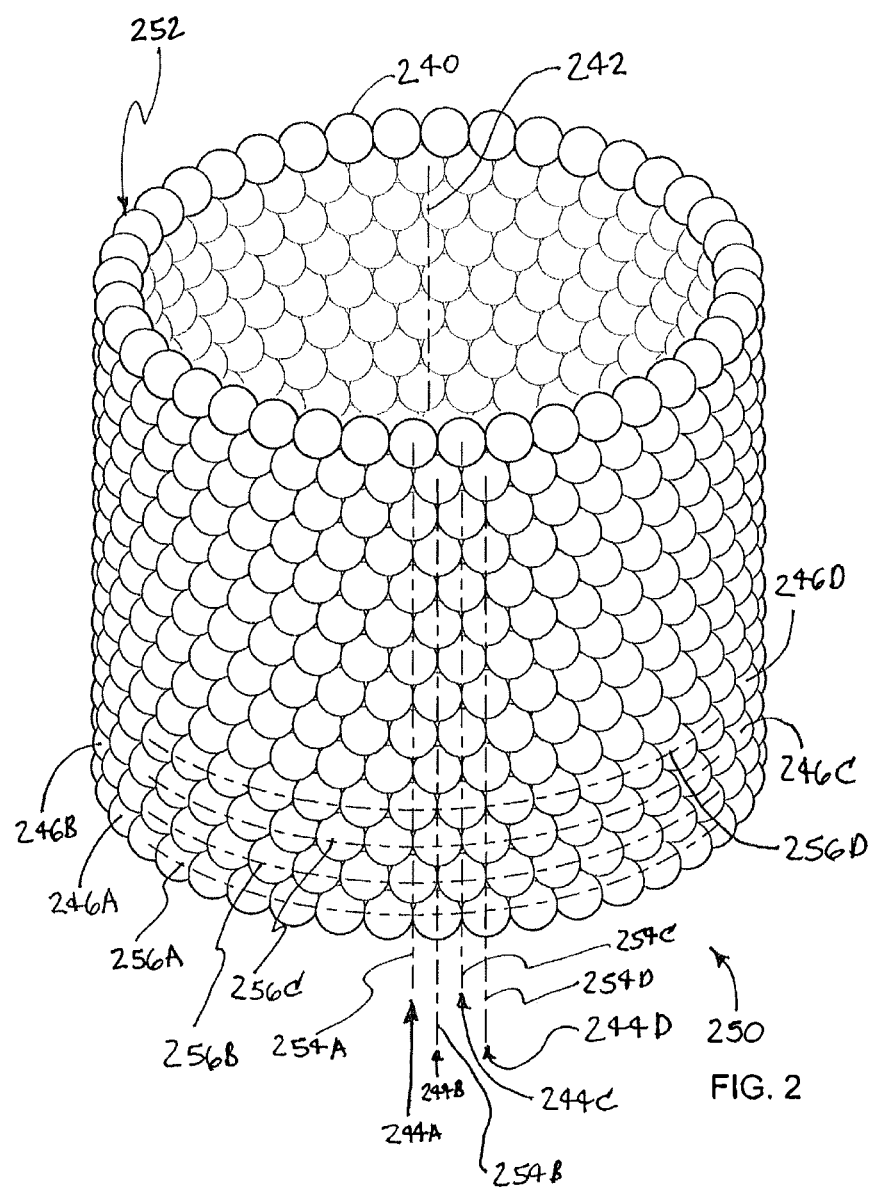
FIG. 2 is a perspective view of a set of preformed fragments arranged to form a sleeve.

Referring to FIG. 2, is a perspective view of a set of preformed fragments 240 arranged to form a sleeve 250 is depicted according to an embodiment of the disclosure. In the embodiment of FIG. 2, sleeve 250 includes a generally tubular wall 252 comprising a single layer of fragments 240 and each fragment 240 has a generally spherical outer surface. The fragments 240 are stacked so that adjacent pairs of fragments 240 are in tangential contact with one another in the embodiment of FIG. 2. The single layer of stacked spheres illustrated in FIG. 2 has a high compressive strength yet almost no shear strength. When sleeve 250 is incorporated into a warhead, a binding material may be used to hold fragments 240 in place prior to detonation of the warhead's explosive charge.

In the embodiment of FIG. 2, the fragments 240 of sleeve 250 are arranged in a plurality of axial columns 244 and circumferential rows 246. A first circumferential row 246A of sleeve 250 includes plurality of fragments 240 positioned along a first curved line 256A. Sleeve 250 also includes a second circumferential row 246B, a third circumferential row 246C, and a fourth circumferential row 246D. Second circumferential row 246B comprises a plurality of fragments 240 that are positioned along a second curved line 256B. Third circumferential row 246C comprises a plurality of fragments 240 that are positioned along a third curved line 256C. In the embodiment of FIG. 2, adjacent circumferential rows, such as second circumferential row 246B and third circumferential row 246C are offset from one another in an axial direction. Fourth circumferential row 246D comprises a plurality of fragments 240 that are positioned along a fourth curved line 256D.

In the embodiment of FIG. 2, sleeve 250 includes a plurality of fragments 240 positioned along a first line 254A to form a first axial column 244A. First line 254A is generally parallel to a central longitudinal axis 242 of sleeve 250 in the embodiment of FIG. 2. A plurality of fragments 240 are positioned along a second line 254B to form a second axial column 244B. In the embodiment of FIG. 2, adjacent axial columns, such as first axial column 244A and second axial column 244B, are offset from one another in a circumferential direction. A plurality of fragments 240 are positioned along a third line 254B to form a third axial column 244B. A plurality of fragments 240 are positioned along a fourth line 254B to form a fourth axial column 244B.

Figures 3A, 3B:
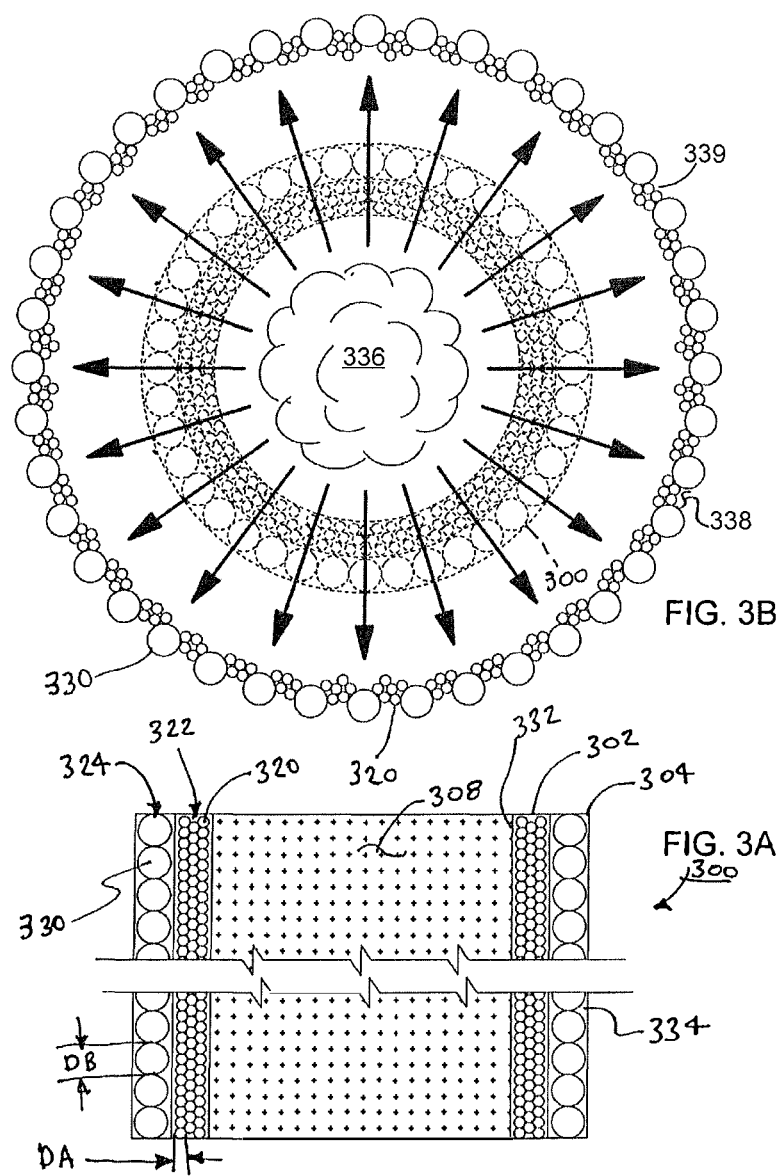
FIG. 3A is a stylized cross-sectional view illustrating a warhead including an explosive charge and two outer wall segments.
FIG. 3B is a stylized axial view illustrating the operating of the warhead shown in FIG. 3A.

Referring to FIG. 3A, a stylized cross-sectional view of a warhead 300 including an explosive charge 308 is depicted according to an embodiment of the disclosure. The depiction of FIG. 3B is a stylized axial view illustrating the operating of the warhead shown in FIG. 3A. More particularly, FIG. 3B provides a stylized illustration showing elements of warhead 300 after detonation of the explosive charge using solid lines. Dashed lines are used to illustrate the elements of warhead 300 prior to detonation of the explosive charge.

With reference to FIG. 3A, it will be appreciated that warhead 300 comprises an explosive charge 308. A first sleeve 302 comprising a first set 322 of preformed fragments is disposed about explosive charge 308. A second sleeve 304 comprising a second set 324 of preformed fragments is disposed about both first sleeve 302 and explosive charge 308. With reference to FIG. 3A, it will be appreciated that first sleeve 302 is sandwiched between explosive charge 308 and second sleeve 304.

In the embodiment of FIG. 3A, the fragments of first sleeve 302 comprise relatively small fragments 320 and the fragments of second sleeve 304 comprise relatively large fragments 330 that are larger than small fragments 320. In the embodiment of FIG. 3A, small fragments 320 are held in place by a first binding material 332 of first sleeve 302. Large fragments 330 are held in place by a second binding material 334 of second sleeve 304 in the embodiment of FIG. 3A. In some embodiments, first binding material 332 and second binding material 334 may comprise the same material.

In the embodiment of FIG. 3A, small fragments 320 and large fragments 330 are both preformed fragments having sufficient strength to remain intact after detonation of explosive charge 308. For example, small fragments 320 and large fragments 330 may both comprise a tungsten alloy. First binding material 332 and second binding material 334 hold the fragments in place until detonation of explosive charge 308. However, first binding material 332 and second binding material 334 lack sufficient strength to remain intact after detonation of explosive charge 308. Said another way, the binding materials are sufficiently frangible to disintegrate upon detonation of explosive charge 308.

The depiction of FIG. 3B is a stylized axial view depicting elements of warhead 300 after detonation of the explosive charge using solid lines. Dashed lines are used to illustrate the elements of warhead 300 prior to detonation of the explosive charge.

With reference to FIG. 3B, it will be appreciated that expanding gases 336 produced by the explosive charge upon detonation have pushed small fragments 320 into contact with large fragments 330. The presence of small fragments 320 are disposed in interstitial spaces 338 between large fragments 330 to temporarily surround the expanding gases 336 with a fragmentation curtain 339. The presence of the fragmentation curtain 339, or more particularly of small fragments 320 in interstitial spaces 338 between large fragments 330, may restrict the flow of the expanding gases 336 between large fragments 330. In this way, small fragments 320 and large fragments 330 may cooperate to contain expanding gases 336 for a longer time before venting of expanding gases 336 has occurred. Increased containment of expanding gases 336 over a longer period of time may increase the kinetic energy transferred to large fragments 330, while only reducing the energy of the small fragments slightly, upon detonation of explosive charge 308 thus significantly increasing the total kinetic energy of the fragmentation.

In some useful embodiments, small fragments 320 and large fragments 330 have curved outer surfaces that facilitate migration of small fragments 320 into interstitial spaces 338 between large fragments 330 when small fragments 320 are forced into contact with large fragments 330 upon detonation of explosive charge 308. In the embodiment of FIG. 3A, each small fragment 320 and each large fragment 330 comprise a generally spherical outer surface. In the embodiment of FIGS. 3A and 3B, each small fragment 320 comprises a preformed sphere having a first diameter DA. Each large fragment 330 comprises a preformed sphere having a second diameter that is larger than the first diameter DB in the embodiment of FIGS. 3A and 3B.

Figures 4A, 4B:
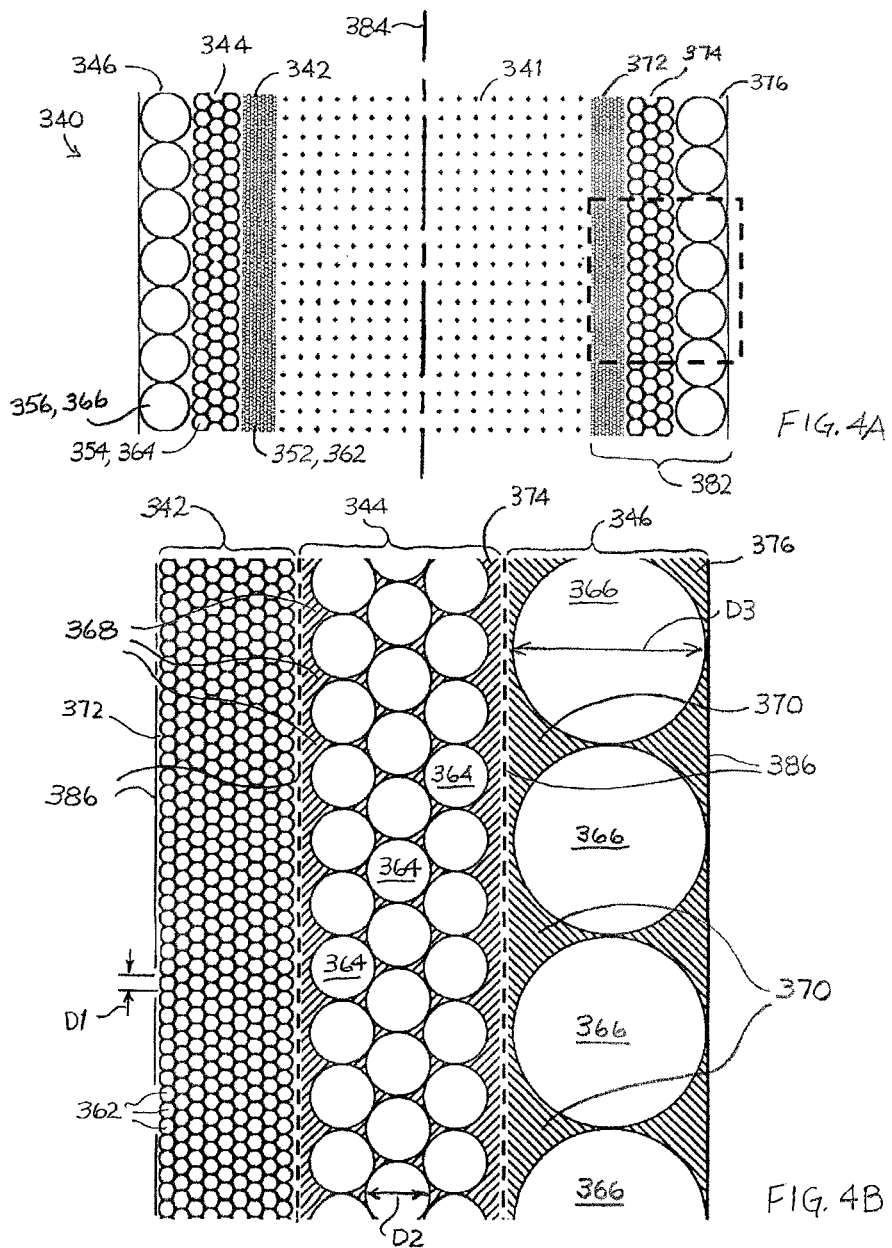
FIG. 4A is a stylized cross-sectional view illustrating a warhead including an explosive charge and three outer wall segments.
FIG. 4B is an enlarged, partial view of the stylized cross-sectional view of FIG. 4A.

Referring to FIGS. 4A and 4B, a stylized cross-sectional view of a warhead 340 is depicted according to an embodiment of the disclosure. The warhead 340 includes an explosive charge 341, and a wall configuration 343 that includes a first wall segment 342 disposed adjacent the explosive charge 341, a second wall segment 344 disposed adjacent the first wall segment 342, and a third wall segment 346 disposed adjacent the second wall segment 344, the second wall segment 344 being disposed between the first wall segment 342 and the third wall segment 346. The first wall segment 342 includes a first set of preformed fragments 352, the second wall segment 344 includes a second set of preformed fragments 354, and the third wall segment 346 includes a third set of preformed fragments 356.

The first, second, and third sets of preformed fragments 352, 354, and 356 include preformed fragments 362, 364, and 366, respectively. Each of the preformed fragments 364 of the second set of preformed fragments 354 are volumetrically larger than each of the preformed fragments 362 of the first set of preformed fragments 352 and volumetrically smaller than the preformed fragments 366 of the third set of preformed fragments 356. Herein, when referring to "smaller preformed fragments 364", the reference is in relation to the preformed fragments 366, and when referring to "larger preformed fragments 364", the reference is in relation to the preformed fragments 362.

In some embodiments, some or all of the sets of preformed fragments 352, 354, 356 define interstitial spaces 368, 370 between the respective preformed fragments 362, 364, 366 of the respective set. In addition to the first, second, and third sets of preformed fragments 352, 354, and 356, the wall segments 342, 344, and 346 may include binding materials 372, 374, and 376, respectively.

In some embodiments the wall configuration 343 takes the form of sleeves 382 that are concentric about a central axis 384 and surround the explosive charge 341 (depicted). In some embodiments the sleeves 382 define an arced or ogive cross-section, akin to FIG. 11G. For the depicted embodiment, the wall configuration 343 defines substantially planar- or cylindrical-wall segment boundaries 386 for the wall segments 342, 344, 346. Such substantially planar- or cylindrical-wall segment boundaries 386 are referred generically or collectively herein as "regular" boundaries 386. In this way, the sleeve 382 defined by the second wall segment 344 may be configured to receive the sleeve 382 defined by the first wall segment 342 and the sleeve 382 defined by the third wall segment 346 may be configured to receive the sleeve 382 defined by the second wall segment 344.

In some embodiments, the binding materials 372, 374, 376 are characterized as having a substantially lower density or a substantially lower melting point (or both) relative to the preformed fragments 362, 364, 366. Candidate materials include epoxy resins, polymers, and certain metal fillers. In some embodiments, the density of the binding material 372, 374, 376 is within a range of 0.5 to 4 grams per cubic centimeter (g/cc) inclusive; in some embodiments, within a range of 0.5 to 2 g/cc inclusive. Herein, a range that is said to be "inclusive" includes the end point values of the stated range as well as all values between the stated end point values.

In some embodiments, a ratio of the density of the preformed fragments 362, 364, 366 (e.g., tungsten alloy, steel) to the binding materials 372, 374, 376 is in a range of 2 to 40 inclusive. In some embodiments, the melting temperature of the binding materials 372, 374, 376 is within a range of 150 to 350 degrees Centigrade (C) inclusive. These melting points are substantially lower than the melting point of candidate materials for the preformed fragments 362, 364, 366 (e.g., tungsten alloy, steel), which may have melting points that fall within a range of 1350° C. to 3425° C.

Figure 5A:
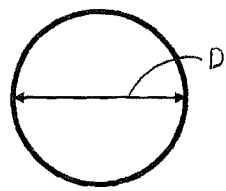
FIG. 5A illustrates the major dimension of a spherical preformed fragment.
Figure 5B:
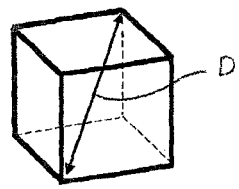
FIG. 5B illustrates the major dimension of a cubical preformed fragment.
Figure 5C:
FIG. 5C illustrates the major dimension of an ellipsoidal preformed fragment.
Figure 5D:
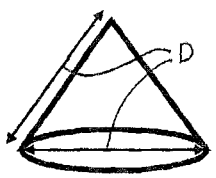
FIG. 5D illustrates the major dimension of a solid conical preformed fragment.

Referring to FIGS. 5A through 5D, preformed fragments 350 of various shapes are depicted according to embodiments of the disclosure. The preformed fragments 362, 364, and 366 may be of various three-dimensional shapes, including, but not limited to a spheres, flattened spheres, discs, a polyhedron, a rounded cube, an ellipsoid, or a solid cone. Examples of projectiles and shot of various shapes that may be suitable for use as the fragments in the embodiments herein are found in U.S. Pat. Nos. 3,877,381; 4,913,054; 5,648,637; 6,161,482; 4,982,666; 4,996,923; 5,325,786; 4,686,904; 2,343,818; 3,952,659; 5,020,438; 5,527,376; 4,173,930; 4,718,348; 4,982,666; 7,607,393; 8,622,000; and 8,122,832. All of these patents are incorporated herein by reference in their entirety for all purposes, except for express definitions and patent claims contained therein. A given three-dimensional shape defines a major dimension D, defined as the largest straight line dimension that can be defined between two opposed points on a surface. For example: for a sphere, the major dimension D is the diameter of the sphere (FIG. 5A); for a cube, the major dimension D is the longer diagonal dimension through the volume of the cube between diagonally opposed corners (FIG. 5B); for an ellipsoid, the major dimension D is the major diameter (FIG. 5C); for a solid cone, the major dimension D is either the diameter of the base or the distance from the edge of the base to the apex, whichever is greater (FIG. 5D).

In some embodiments, the first set of preformed fragments are of a first uniform shape, the second set of preformed fragments are of a second uniform shape, and the third set of preformed fragments are of a third uniform shape. The first set of preformed fragments 342, the second set of preformed fragments 344, and the third set of preformed fragments 346 may each define an average major dimension D1, D2, and D3, respectively. In some embodiments, the average major dimension D2 of the second set of preformed fragments 344 is greater than the average major dimension D1 of the first set of preformed fragments 342. The average major dimension D3 of the third set of preformed fragments 346 may be greater than the average major dimension D2 of the second set of preformed fragments. In some embodiments, a ratio of the average major dimension D2 to D1 is in a range of 1.5 to 5 inclusive; in some embodiments, in a range of 2 to 4 inclusive. In some embodiments, a ratio of the average major dimension D3 to D2 is in a range of 1.5 to 5 inclusive; in some embodiments, in a range of 2 to 4 inclusive. The stated ranges of the D2/D1 and D3/D2 ratios may translate to volumetric ratios that are within a range 3 to 125 inclusive and 8 to 64 inclusive, respectively.

In some embodiments, all of the preformed fragments 362, 364, 366 within a given set of preformed fragments 342, 344, and 346 define the same three-dimensional shape. In some embodiments, all of the preformed fragments 362, 364, 366 across all sets of preformed fragments 352, 354, and 356 define the same three-dimensional shape.

Figure 6A:
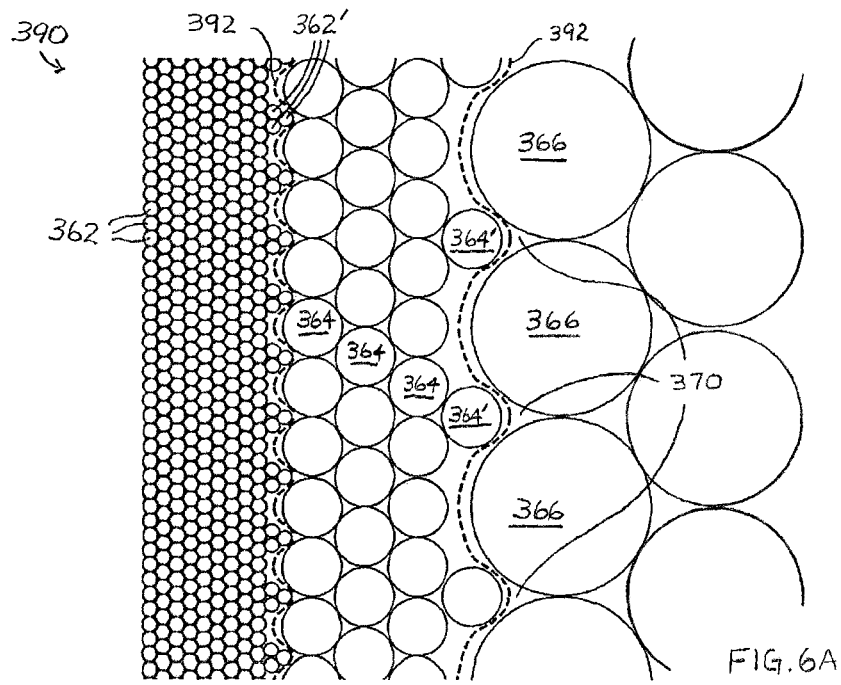
FIG. 6A is an enlarged, partial view of a wall configuration having three wall segments with irregular boundaries.

Referring to FIG. 6A, a wall configuration 390 for the warhead 340 is depicted according to an embodiment of the disclosure. The wall configuration 390 may include some of the same components and attributes as the wall configuration 343, at least some of which are indicated with same-labeled reference characters. A distinction of the wall configuration 390 relative to the wall configuration 343 is that some of preformed fragments 362, 364 are predisposed in the interstitial spaces 368, 370 of the adjacent, relatively larger preformed fragments 364, 366, respectively. These predisposed preformed fragments 362', 364' reside at least partially within the interstitial spaces 368, 370 when in the assembled, pre-detonated configuration. Accordingly, instead of all the preformed fragments 362, 364, 366 being contained within regular boundaries 386 (e.g., planar- or cylindrical-shaped boundaries) between the preformed sets of fragments 352, 354, and 356 (FIG. 4B), the predisposed preformed fragments 362' and/or 364' extend into the interstitial spaces 368 and/or 370 of the relatively larger preformed fragments 364 and/or 366 to define irregular boundaries 392 between the preformed sets of fragments 352, 354, and 356 in the assembled, pre-detonated configuration (FIG. 6A).

While the wall configuration 390 depicts the boundaries between the both the wall segments 342, 344 and the wall segments 344, 346 as being irregular boundaries 392, a mix of regular boundaries 386 and irregular boundaries 392 is contemplated. That is, configurations that, for example, include the irregular boundary 392 between the wall segments 342 and 344 and regular boundaries 386 between the wall segments 344 and 346 are contemplated. The optional binding materials 372, 374, 376 are omitted from FIG. 6A for clarity.

Figure 6B:
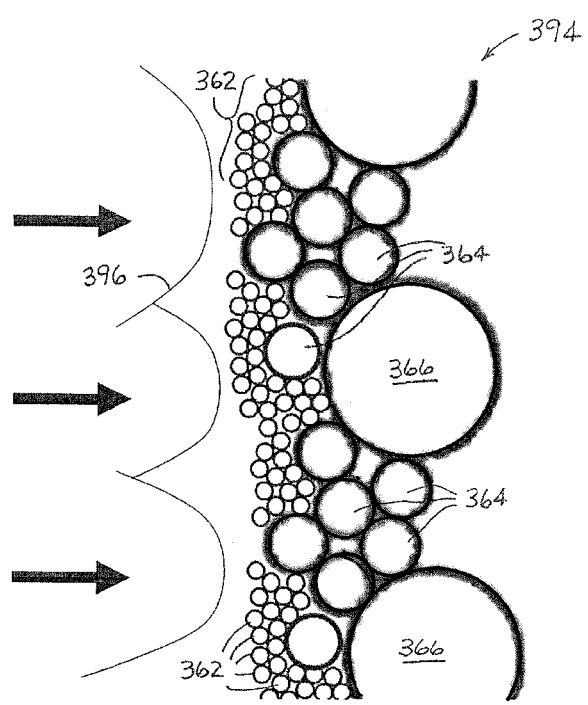
FIG. 6B is a partial view of a propagating fragmentation curtain after detonation of the warhead of FIG. 6A.

Referring to FIG. 6B, an example of a portion of a fragmentation curtain 394 momentarily created by the wall configurations 343, 390 upon detonation of the explosive charge 341 is depicted according to an embodiment of the disclosure. The detonation generates expanding gases 396 that vaporize the binding materials 372, 374, 376 and push the smaller preformed fragments 362, 364 into contact with larger preformed fragments 364, 366. Expansion of the gases 396 may cause the interstitial spaces 368, 370 to grow as the larger preformed fragments 364, 366 are propelled away from the detonation. The smaller preformed fragments 362, 364 are pushed into the interstitial spaces 368, 370, even if the larger preformed fragments 364, 366 are separating from each other to increase the size of the interstitial spaces 368, 370 to momentarily form the fragmentation curtain 394 that propagates away from the detonation. In this way, smaller the preformed fragments 362, 364 and larger preformed fragments 364, 366 cooperate to contain the expanding gases 396 for a longer time transient before the fragmentation curtain 394 disperses. The longer containment period for the expanding gases 396 acts to increase the kinetic energy imparted to the preformed fragments 366, while reducing the kinetic energy of the smaller the preformed fragments 362, 364 only slightly, upon detonation of explosive charge 308 thus significantly increasing the total kinetic energy of the fragmentation. Furthermore, some of kinetic energy imparted to the smaller preformed fragments 362, 364 is transferred to the preformed fragments 366 during the collisions between the smaller preformed fragments 362, 364 and the larger preformed fragments 364, 366.

Figure 9D:
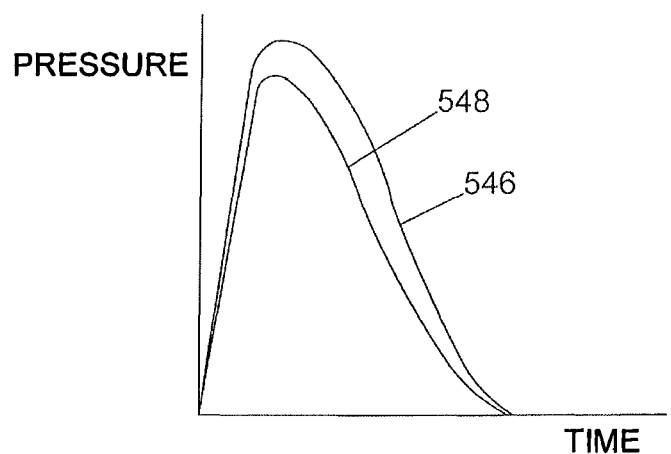
FIG. 9D is a theorized pressure curve chart illustrating gains associated with embodiments of the disclosure.

Functionally, the preformed fragments 362, 364, 366 held together by binding materials 372, 374, 376 requires less energy to separate and release the fragments than does a pre-fragmented frangible homogeneous medium of comparable structural integrity. The smaller preformed fragments 362, 364 have less inertia than the adjacent larger preformed fragments 364, 366, causing the smaller preformed fragments 362, 364 to collide with the larger preformed fragments 364, 366, even as the larger preformed fragments 364, 366 are propelled away from the smaller preformed fragments 362, 364. This causes some of the smaller preformed fragments 362, 364 to momentarily migrate into and cluster within the interstitial spaces 368, 370. The clustering may be facilitated by larger preformed fragments 364, 366 that define convex surfaces (e.g., spheres, polyhedrons, radiused edges and corners) which may effectively funnel the smaller performed fragments 362, 364 into the interstitial spaces 368, 370. The transient presence of the clustered smaller preformed fragments 362, 364 within the interstitial spaces 368, 370 further obstructs the flow of the expanding gases 396 through the interstitial spaces 368, 370. Effectively, the clustering of the smaller preformed fragments 362, 364 decreases the porosity of the fragmentation curtain 394 locally at the interstitial spaces 368, 370. The decrease in the porosity and attendant restriction in flow, however brief and transient, causes an increase in the pressure drop across the fragmentation curtain 394 relative to a system that lacks the smaller interstitial spaces 368, 370. The increased pressure effect is illustrated at FIG. 9D.

The binding materials 372, 374, 376 function to suspend the preformed fragments 362, 364, 366 in a desired arrangement and at desired locations within the respective wall segment 342, 344, 346. In some embodiments, the preformed fragments 362, 364, 366 are encased or partially encases within the binding materials 372, 374, 376. The binding materials 372, 374, 376 vaporize or otherwise flow around the fragments preformed fragments 362, 364, 366 within a time frame that is shorter than the time required to propel the preformed fragments 362, 364, 366 into the interstitial spaces 368, 370. Accordingly, the binding materials 372, 374, 376 do not interfere with the clustering of the formation of the smaller preformed fragments 362, 364 within the interstitial spaces 368, 370 and the subsequent formation of the fragmentation curtain 396.

For embodiments that implement predisposed preformed fragments 362', 364' in the interstitial spaces 368, 370 at assembly (FIG. 6A), the placement of the predisposed smaller preformed fragments 362', 364' may substantially fill the interstitial spaces 368, 370 prior to detonation. As such, the clustering of the smaller preformed fragments 362, 364 may be tighter (less porous) after detonation, and may rely less on the random dynamics of fragment interaction to form the clusters.

Figure 7:
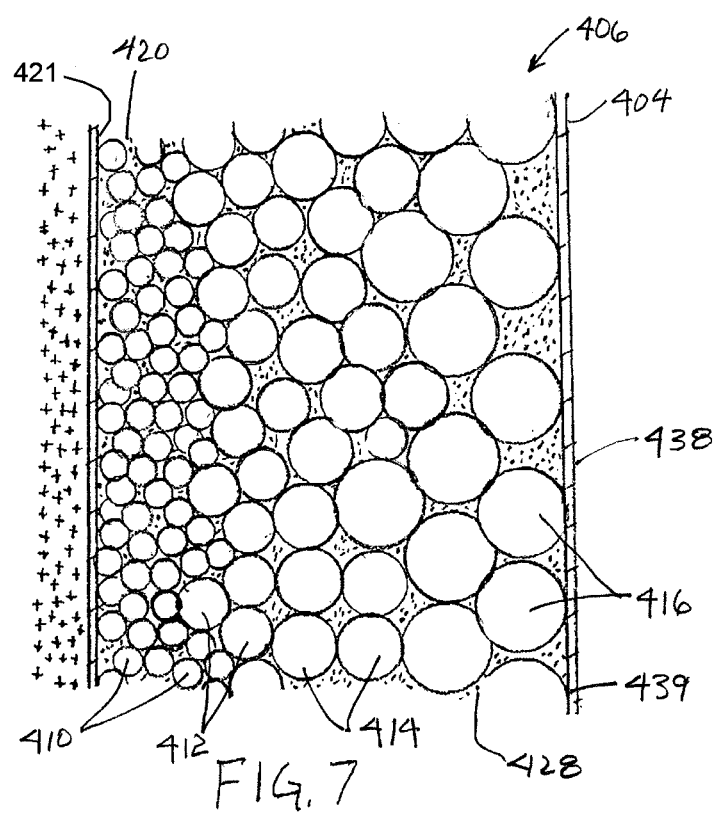
FIG. 7 is an enlarged, partial cross-sectional view of a wall configuration having a gradient of different size fragments increasing in size from the inner margin to the outer exterior margin without distinct ordered layers.

Referring to FIG. 7, a further embodiment of a partial wall 404 of an explosive fragmentation portion 406 where there are four or more different volumetrically sized fragments 410, 412, 414, 416. A layer 420 of the smallest fragments 410 is at an inner margin 421 defined by a wall 424, formed, for example, of steel, and is adjacent to the explosive material 414. A layer 428 of the largest fragments 416 is positioned at the outer wall 438, defining an outer dispersion margin 439 of the explosive fragmentation portion. The intermediate sized fragments 412, 414 are positioned intermediate the layer 420 of the smallest sized fragments and the layer 428 of the largest sized fragments and may be in generally ordered layers or may be in a disordered arrangement. The partial wall may have an annular shape and be part of a warhead, or may be a slab suitable for a mine, for example. In embodiments, several slabs may be arranged to form an annular explosive fragmentation arrangement.

Referring to FIGS. 8A and 8B, stylized cross-sectional views of a first warhead configuration 460A and a second warhead configuration 460B is depicted according to embodiments of the disclosure. HYDROCODE analyses were performed on both first warhead configuration 460A and second warhead configuration 460B. The results of the HYDROCODE analysis are plotted in FIGS. 9A and 9B.

The first warhead configuration 460A of FIG. 8A comprises a first sleeve 402 with a first set 422 of preformed fragments disposed about an explosive charge 408. A second sleeve 404 comprising a second set 424 of preformed fragments is disposed about both first sleeve 402 and explosive charge 408. In the embodiment of FIG. 8A, the fragments of first sleeve 402 comprise relatively large fragments and the fragments of second sleeve 404 with relatively small fragments that are smaller than the fragments of first sleeve 402. First warhead configuration 460A includes a first cap 436 that is located at first end of the sleeves and a second cap 438 that is located at a second end of the sleeves. In FIG. 8A, a detonator 428 can be seen contacting explosive charge 408.

The second warhead configuration 460B shown in FIG. 8B comprises a first sleeve 502 with a first set 522 of preformed fragments disposed about an explosive charge 508. A second sleeve 504 comprising a second set 524 of preformed fragments is disposed about both first sleeve 502 and explosive charge 508. In the embodiment of FIG. 8B, the fragments of first sleeve 502 comprise relatively small fragments and the fragments of second sleeve 504 comprise relatively large fragments that are larger than the fragments of first sleeve 502. Second warhead configuration 460B includes a first cap 536 that is located at first end of the sleeves and a second cap 538 that is located at a second end of the sleeves. In FIG. 8B, a detonator 528 can be seen contacting explosive charge 508.

With reference to FIGS. 8A and 8B, it will be appreciated that warhead configuration 460A and warhead configuration 460B both include an explosive charge. For purposes of the hydrocode analysis, warhead configuration 460A and warhead configuration 460B had identical explosive charges including the same mass of high explosives. Warhead configuration 460A and warhead configuration 460B both include a set of relatively small fragments and a set of relatively large fragments. For purposes of the hydrocode analysis, warhead configuration 460A and warhead configuration 460B had identical sets of small and large fragments having identical masses. The primary difference between the two configurations was the arrangement of the two sets of fragments. With reference to FIGS. 8A and 8B, it will be appreciated that, in the first warhead configuration 460A of FIG. 8A the large fragments are located between the explosive charge and the small fragments. It will also be appreciated that, in the second warhead configuration 460B shown in FIG. 8B the small fragments are located between the explosive charge and of the large fragments.

Referring to FIGS. 9A and 9B, graphs illustrating the results of the hydrocode analysis performed on the two warhead configurations of FIGS. 8A and 8B. The graph of FIG. 9A illustrates the energy profile of the first warhead configuration 460A. Fragment kinetic energy vs. polar location is plotted on this graph. The data points representing the kinetic energy of the large fragments are shown as open triangles and the data points representing the kinetic energy of the small fragments are shown as closed triangles.

The graph of FIG. 9B illustrates the energy profile of a warhead with the second warhead configuration 460B. Fragment kinetic energy vs. polar location is plotted in this graph. The data points representing the kinetic energy of the large fragments are shown as open circles and the data points representing the kinetic energy of the small fragments are shown as closed circles.

The results of the hydrocode analysis showed a substantial increase in fragment kinetic energy of the second warhead configuration 460B as compared to the first warhead configuration 460A.

Referring to FIG. 9D, a theorized pressure curve chart illustrates pressure increases associated for embodiments of the disclosure. A first curve 546 and a second curve 548 are depicted, with the second curve representing the theorized pressure gains associated with embodiments of the disclosure. The fragmentation curtain 339 of FIG. 3B is depicted as being substantially continuous about the expanding gasses 336. Such a continuous fragmentation curtain 339 is an ideal circumstance for a sleeved configuration. In some embodiments, the wall configuration 343, 390 defines a substantially planar slab, with the fragmentation curtain 339 emanating primarily in a single direction (i.e., does not surround the detonation). Skilled artisans in the relevant arts will recognize, in view of this disclosure, that, given the transient nature of the detonation event, even partial, discontinuous, or non-surrounding fragmentation curtains 339 may produce the desired effects of FIG. 9D.

Figures 10A, 10B, 10C, 10D:
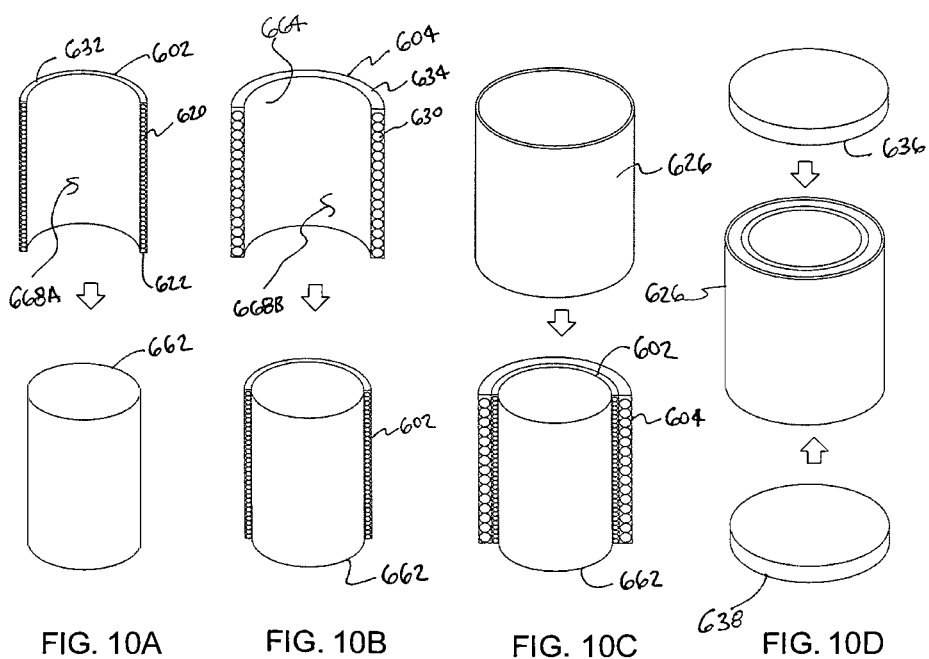
FIG. 10A through 10D are a series of stylized perspective views illustrating example methods in accordance with the disclosure and apparatus associated with those methods.

Referring to FIGS. 10A through 10D, referred to collectively herein as FIGS. 10, a series of stylized perspective views illustrating example fabrication methods and an apparatus associated with those methods are depicted in accordance with embodiments of the disclosure. At FIG. 10A, a first sleeve 602 is assembled over an explosive fill container 662. High explosives may be placed in explosive fill container 662 at various times without deviating from the spirit and scope of this detailed description. In the embodiment of FIGS. 10, first sleeve 602 has a generally annular shape including an inner surface that defines a first cavity 668A. Although one half of an annular shape is shown, embodiments will include assembly of complete annular sleeves and partial annular sleeves. With reference to FIG. 10A, it will be appreciated that first cavity 668A is dimensioned to receive explosive fill container 662. First sleeve 602 comprises a first set 622 of preformed fragments. In the embodiment of FIG. 10A, first set 622 comprise small fragments 620.

At FIG. 10B, a second sleeve 604 is assembled over first sleeve 602 and explosive fill container 662. Second sleeve 604 has a generally annular shape including an inner surface 664 that defines a second cavity 668B. It will be appreciated that second cavity 668B is dimensioned to receive first sleeve 602 and explosive fill container 662. With reference to FIG. 10C, it will be appreciated that first sleeve 602 will be sandwiched between explosive charge 608 and second sleeve 604 after second sleeve 604 is assembled over first sleeve 602.

In the embodiment of FIGS. 10, the fragments of first sleeve 602 comprise relatively small fragments 620 and the fragments of second sleeve 604 comprise relatively large fragments 630 that are larger than small fragments 620. In the embodiment of FIGS. 10, small fragments 620 are held in place by a first binding material 632 of first sleeve 602. Large fragments 630 are held in place by a second binding material 634 of second sleeve 604 in the embodiment of FIG. 10. In some embodiments, first binding material 632 and second binding material 634 may comprise the same material.

At FIG. 10C, a sheath 626 is installed over second sleeve 604, first sleeve 602 and explosive fill container 662. In the embodiment of FIG. 10C, sheath 626 has a generally annular or tube-like shape.

At FIG. 10D, a first cap 636 is fixed to a first end of sheath 626 and a second cap 638 is fixed to a second end of sheath 626. First cap 636, second cap 638 and sheath 626 may cooperate to contain, secure and protect all components located therein.

Figures 11A, 11B:
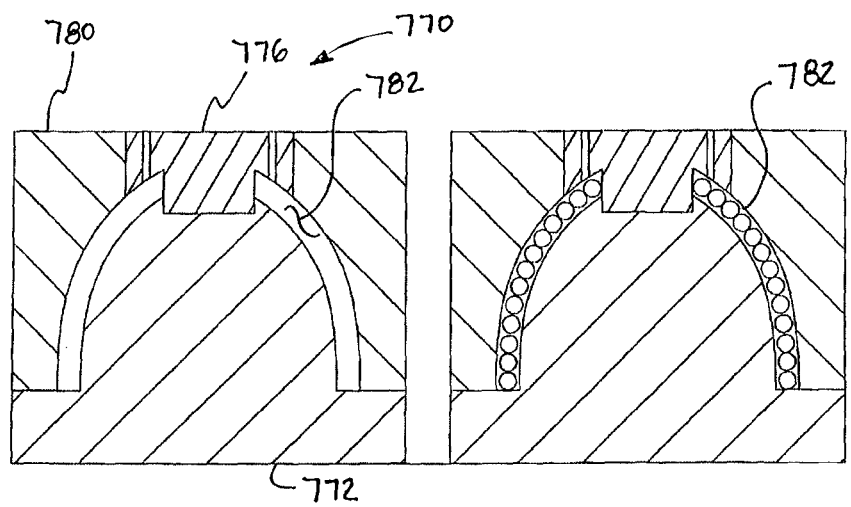
FIGS. 11A through 11G are a series of cross sectional views of a mold and steps of manufacturing in accord with embodiments of the disclosure.

At FIGS. 11A through 11G, a series of cross sectional views of a mold and steps of manufacturing is depicted according to embodiments of the disclosure. A mold 770 is provided. The mold 770 defines a first annular containment 782. In the embodiment of FIG. 11A, mold 770 comprises a first core 772, a mold body 780, and a first plug 776. First core 772, mold body 780, and first plug 776 cooperate to define the first annular containment 782 in the embodiment of FIG. 11A. The first plug 776 defines passageways that fluidly communicate with the first annular containment 782.

At FIG. 11B, a first multiplicity of spherical fragments of a uniform first size are loaded within the first annular containment 782. The first multiplicity of spherical fragments are arranged to form a wall comprising a single layer of fragments. The fragments are arranged so outer spherical surfaces of adjacent pairs of fragments are in tangential contact with one another in the embodiment of FIG. 11B.

Figures 11C, 11D:
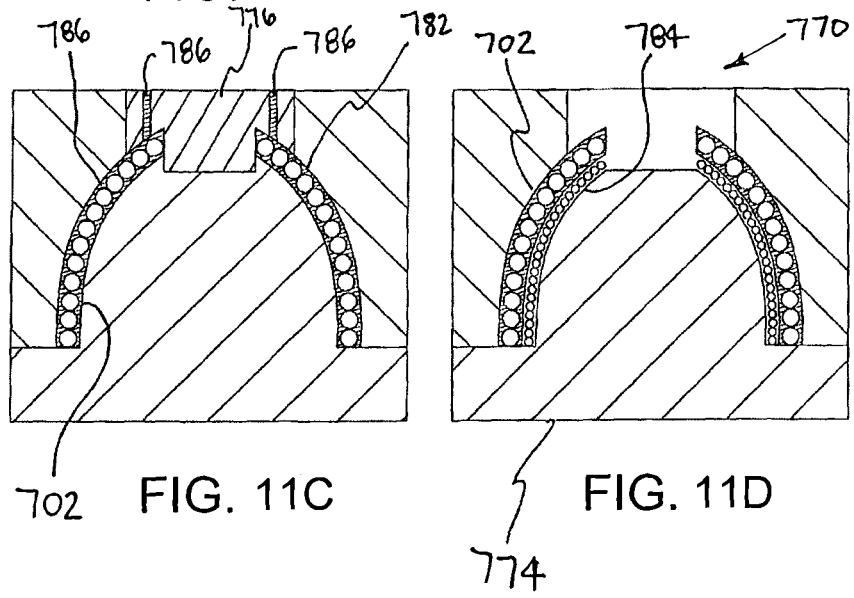

At FIG. 11C, the first annular containment 782 is filled with a first annular containment binder 786. The first annular containment binder 786 has a flowable condition so that the first annular containment binder flows into space between fragments. In this way, the first annular containment binder 786 fills the volume of the first annular containment that is not occupied by fragments so that the first annular containment binder 786 may hold the fragments in place after the first annular containment binder 786 has been allowed to harden. The hardened first annular containment binder 786 and spherical fragments embedded within the first annular containment binder 786 form a first sleeve 702. With reference to FIG. 11C, it will be appreciated that first sleeve 702 generally has the shape of the first annular containment 782.

At FIG. 11D, the first mold insert 776 and the first core 772 are removed from the mold 770. A second core 774 is placed in the position formerly occupied by the first core 772. The second core 774 and first sleeve 702 defined a second annular containment 784. A second multiplicity of spherical fragments of a uniform second size are loaded within the second annular containment 784.

Figures 11E, 11F:
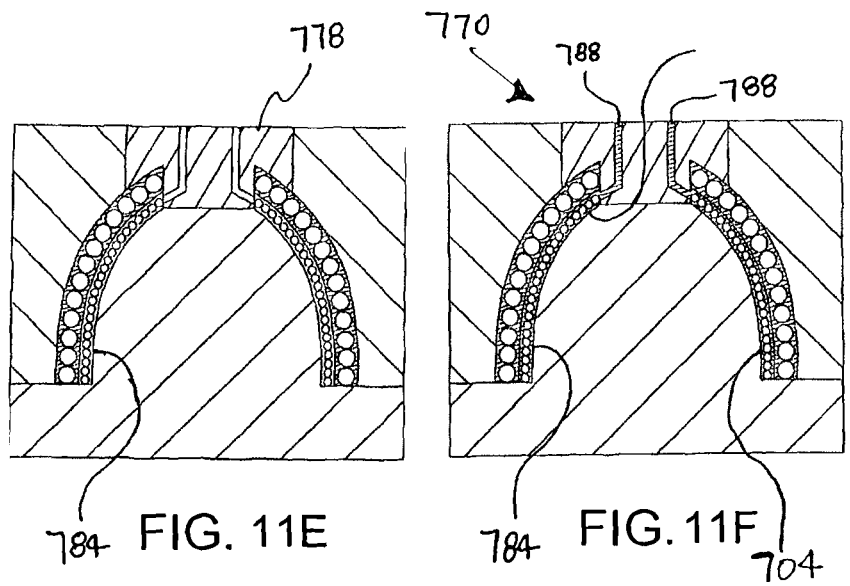

At FIG. 11E, a second mold insert 778 has been placed in the position formerly occupied by first mold insert 776. Second plug 778 defines passageways that fluidly communicate with the second annular containment 784.

At FIG. 11F, the second annular containment 784 is filled with a second annular containment binder 788. The second annular containment binder 788 has a flowable condition so that the second annular containment binder 788 flows into space between fragments. In this way, the second annular containment binder 788 fills the volume of the second annular containment that is not occupied by fragments so that the second annular containment binder 788 will hold the fragments in place after the second annular containment binder 788 has been allowed to harden. The hardened second annular containment binder 788 and spherical fragments embedded within the second annular containment binder 788 form a second sleeve 704. The second sleeve 704 generally has the shape of the second annular containment 784.

Figure 11G:
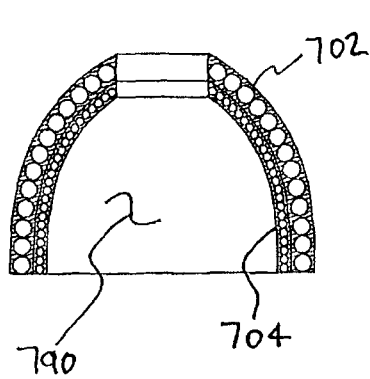

At FIG. 11G, the first sleeve 702 and the second sleeve 704 have been removed from the mold 770. The second sleeve 704 defines a cavity 790. A warhead in accordance with this detailed description may include first sleeve 702, second sleeve 704 and an explosive charge disposed in cavity 790. The explosive charge may comprise, for example, a container filled with high explosives.

With continuing reference to FIGS. 11A through 11G, it will be appreciated that a method of manufacturing a warhead in accordance with this detailed description may include loading a first multiplicity of spherical fragments of a uniform first size within a first annular containment in an ordered arrangement and filling the first annular containment with a first annular containment binder for at least substantially covering the first multiplicity of spherical fragments. The first annular containment binder may have a flowable condition to facilitate filling of the first annular containment. The method may include allowing the binder to harden wherein the spherical fragments are embedded within the first annular containment binder in a first annular form having the shape of the first annular containment. This example method may also include loading a second multiplicity of spherical fragments of a uniform second size within a second annular containment having a wall surface that corresponds to a wall surface of the first annular containment. This method may additionally include filling the second annular containment with a second annular containment binder for at least substantially covering the multiplicity of spherical fragments. The second annular containment binder may have a flowable condition to facilitate filling of the second annular containment. The method may include allowing the second annular containment binder to harden wherein the spherical fragments are embedded within the second annular containment binder in a second annular form with the shape of the second annular containment. An explosive material may be positioned within a cavity defined by the annular forms. The first annular form, the second annular form and the explosive material may be positioned within a housing with one annular form interior to the other annular form.

Some example methods may include utilizing the second annular containment to define part of the first annular form and/or utilizing the first annular containment to define part of the second annular form.

Some example methods may include loading the second multiplicity of fragments such that each fragment that is not at a periphery of the ordered arrangement but is in contact with a plurality of other adjacent fragments of the same size.

Some example methods may include overmolding one of the first annular form and the second annular form over the other of the first annular form and the second annular form.

Some example methods may include utilizing a thermoplastic resin as the first annular containment binder. A thermoplastic resin may also be utilized for the second annular containment binder in some example methods.

Some example methods may include installing the warhead in a deliverable weapon platform such as a missile, an artillery round, an aerial bomb, a mortar round, or a grenade.

Figure 12:
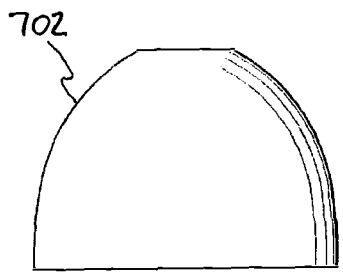
FIG. 12 is a side view showing an assembly fabricated using the manufacturing steps illustrated in FIGS. 11A through 11G.

Referring to FIG. 12, a side view of an assembly fabricated using the manufacturing steps illustrated in FIGS. 11A through 11G is depicted according to an embodiment of the disclosure. An outer surface of first sleeve 702 is visible in FIG. 12.

Referring to FIGS. 13 through 15, perspective views of illustrative warheads are depicted according to embodiments of the disclosure. The warheads may have various three dimensional shapes without deviating from the spirit and scope of this detailed description.

Figure 16A:
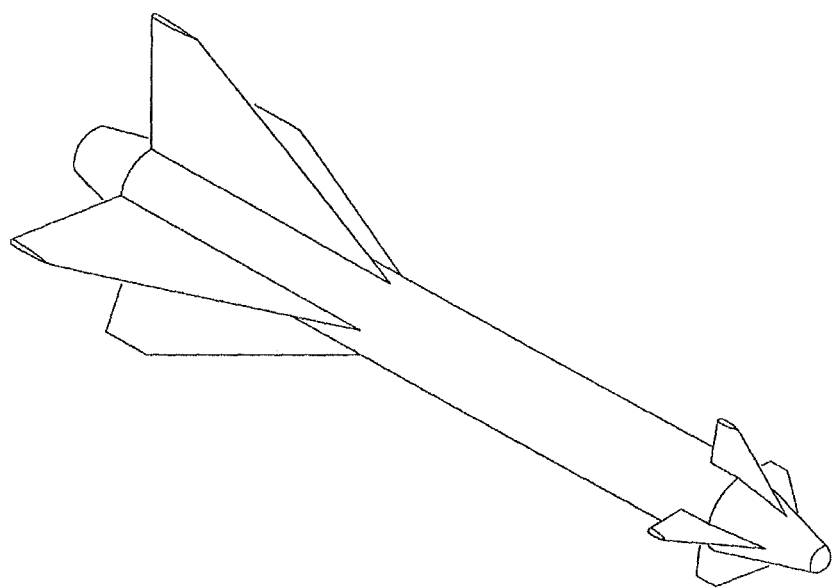
FIG. 16A is a perspective of a missile according to embodiments of the disclosure.

Referring to FIG. 16A, a perspective of a missile is depicted according to an embodiment of the disclosure. The missile of FIG. 16A may include a warhead such as the illustrative warheads discussed in this detailed description. The missile may deliver the warhead to a precise location near a target. Once the warhead is near the target, the explosive charge may be detonated. The warhead may include concentric annular sleeves that upon detonation provide placement of smaller fragments of an inner annular sleeve interstitially with respect to larger fragments of an outer annular sleeve in an expanding fragmentation curtain that contains expanding gases to increase the pressure of the explosion and the kinetic energy transferred to the fragments. The fragments may neutralize the target.

Figure 16B:
FIG. 16B is a perspective view of an artillery projectile according to embodiments of the disclosure.

Referring to FIG. 16B, a perspective view of an artillery projectile is depicted according to an embodiment of the disclosure. The artillery projectile of FIG. 16B may include a warhead such as the illustrative warheads discussed in this detailed description. Warheads in accordance with this detailed description may be carried by various deliverable weapons. Examples of deliverable weapons include missiles, artillery rounds, aerial bombs, torpedoes, mortar rounds, and grenades. Warheads in accordance with this detailed description may also be incorporated into non-deliverable weapons, for example, landmines, underwater naval mines, and ocean floor mines. In some applications, a warhead in accordance with this detailed description may have a explosive fragmentation portion that has generally planar shapes, dome shapes, bowl shapes, slab shapes. Various fragmentation wall portions may be combined about explosive material to form a warhead in a delivery platform as described herein.

Patents illustrating suitable platforms for utilization of the embodiments disclosed herein include the following U.S. Pat. Nos. 8,931,415; 7,614,348; 6,981,672; 5,925,845; 5,404,813; 5,107,766; 4,123,974; 3,838,642; 3,724,379; 2,892,401; 2,479,861; and 2,377,174. All of these patents are incorporated by reference herein in their entirety for all purposes, except for express definitions and patent claims contained therein.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. An explosive device having fragments with enhanced acceleration and velocity upon explosion of the warhead, the warhead having a layer of smaller fragments positioned between a layer of larger fragments and an explosive material, volumetrically, the mean size of the smaller fragments is less than the mean size of the larger fragments, and wherein no explosive material is positioned between the layer of smaller fragments and the layer of larger fragments, whereby, upon an explosion of the explosive material, the smaller fragments and larger fragments coalesce providing an enhanced dynamic containment of expanding gases of the explosion increasing the pressure of the explosion and the kinetic energy of the fragments.

2. The explosive device of claim 1, wherein the device is configured
   as a warhead,
   on a missile or artillery round.

3. The explosive device of claim 2, wherein the layer of smaller fragments is bound by a frangible binder.

4. The explosive device of claim 3, wherein the layer of small fragments and the layer of larger fragments each define annular containments.

5. A method of manufacturing an explosive device comprising the steps of
   disposing a layer of small bound fragments about an explosive charge;
   disposing a layer of larger bound fragments about the layer of small bound fragments without an explosive therebetween, the layer of larger bound fragments about the layer of small bound fragments defining a fragmentation portion;
   enclosing the explosive charge and the fragmentation portion within a housing.

6. The method of claim 5, further comprising configuring the layer of small bound fragments as an annular containment and configuring the layer of larger bound fragments also as an annular containment.

7. The method of claim 6, further comprising configuring the explosive charge as a cylindrical shape.

8. The method of claim 5, further comprising adding a detonator to the explosive device.

9. The method of claim 5, as a warhead and attaching the warhead to an artillery round.

10. The method of claim 5, further comprising configuring the explosive device as a grenade.

11. The method of claim 5, further comprising binding the small fragments in a frangible binding material.

12. The method of claim 5, selecting the larger fragments to comprise a tungsten alloy.

13. The method of claim 5, adding a third layer of bound fragments to the layer of small bound fragments and the layer of larger bound fragments.

14. The method of claim 5, selecting the small fragments to be all uniform in size and shape.

15. An explosive device, comprising:
   an explosive charge;
   a first wall disposed adjacent said explosive charge and including a first set of preformed fragments;
   a second wall disposed adjacent said first wall and including a second set of preformed fragments;

the explosive charge, the first wall, and the second wall enclosed in a housing, wherein:

the preformed fragments of said second set of preformed fragments are volumetrically larger than the preformed fragments of said first set of preformed fragments; and said first wall and said second wall are configured so that said first set of preformed fragments contact said second set of fragments upon detonation of said explosive charge.

16. The explosive device of claim 15, wherein:

said second set of preformed fragments defines a plurality of interstitial spaces; and upon detonation of said explosive charge, said explosive device is configured so that some of the preformed fragments of said first set of preformed fragments are forced into said plurality of interstitial spaces of said second set of preformed fragments to temporarily restrict flow of expanding gases through said second set of preformed fragments.

17. The explosive device of claim 15, wherein:

the preformed fragments of said first set of preformed fragments are of a first uniform shape; and the preformed fragments of said second set of preformed fragments are of a second uniform shape.

18. The explosive device of claim 15, wherein:

each preformed fragment of said first set of preformed fragments defines a three-dimensional shape selected from the group consisting of a sphere, a polyhedron, a rounded cube, a flattened sphere, an ellipsoid, and a solid cone; and each preformed fragment of said second set of preformed fragments defines a three-dimensional shape selected from the group consisting of a sphere, a polyhedron, a rounded cube, an ellipsoid, and a solid cone.

19. The explosive device of claim 15, wherein said first set of preformed fragments and said second set of preformed fragments each define an average major dimension, said average major dimension of said second set of preformed fragments being greater than said average major dimension of said first set of preformed fragments by a factor of 2 to 4 inclusive.

20. The explosive device of claim 19, wherein:

said first wall includes a binding material that suspends and secures said first set of preformed fragments within said first wall prior to detonation; and said second wall includes a binding material that suspends and secures said second set of preformed fragments within said second wall prior to detonation.

* * * * *

UNITED STATES PATENT AND TRADEMARK OFFICE
CERTIFICATE OF CORRECTION

| | |
|---|---|
| PATENT NO. | : 12,072,171 B1 |
| APPLICATION NO. | : 18/125796 |
| DATED | : August 27, 2024 |
| INVENTOR(S) | : Gabriel J. Bonnstetter, Richard M. Truitt and Reid W. Wagnild |

It is certified that error appears in the above-identified patent and that said Letters Patent is hereby corrected as shown below:

In the Specification

Column 1, Line 12, under Related Applications:
Delete "63/120,986" and insert -- 63/120,968 --, therefor.

Signed and Sealed this
Twenty-second Day of April, 2025

Coke Morgan Stewart
*Acting Director of the United States Patent and Trademark Office*